(12) United States Patent
Mate et al.

(10) Patent No.: US 11,622,219 B2
(45) Date of Patent: Apr. 4, 2023

(54) APPARATUS, A METHOD AND A COMPUTER PROGRAM FOR DELIVERING AUDIO SCENE ENTITIES

(71) Applicant: Nokia Technologies Oy, Espoo (FI)

(72) Inventors: Sujeet Shyamsundar Mate, Tampere (FI); Arto Juhani Lehtiniemi, Lempäälä (FI); Antti Johannes Eronen, Tampere (FI); Jussi Artturi Leppänen, Tampere (FI)

(73) Assignee: NOKIA TECHNOLOGIES OY, Espoo (FI)

( * ) Notice: Subject to any disclaimer, the term of this patent is extended or adjusted under 35 U.S.C. 154(b) by 0 days.

(21) Appl. No.: 16/521,566

(22) Filed: Jul. 24, 2019

(65) Prior Publication Data

US 2021/0029480 A1   Jan. 28, 2021

(51) Int. Cl.
*G06F 17/00* (2019.01)
*H04S 7/00* (2006.01)
*H04S 3/00* (2006.01)

(52) U.S. Cl.
CPC ............... *H04S 7/30* (2013.01); *H04S 3/008* (2013.01); *H04S 2400/01* (2013.01); *H04S 2400/11* (2013.01); *H04S 2420/11* (2013.01)

(58) Field of Classification Search
CPC ....... G06F 3/165; G10L 19/008; H04S 3/008; H04S 7/30; H04S 7/303; H04S 2400/01; H04S 2400/03; H04S 2400/11; H04S 2400/15; H04S 2420/01; H04S 2420/03; H04S 2420/11
USPC .......................................................... 700/94
See application file for complete search history.

(56) References Cited

U.S. PATENT DOCUMENTS

| | | | |
|---|---|---|---|
| 8,340,798 B2 * | 12/2012 | Oh | H04S 7/30 700/94 |
| 9,712,936 B2 | 7/2017 | Peters | |
| 9,973,874 B2 | 5/2018 | Stein et al. | |
| 2009/0222118 A1 * | 9/2009 | Oh | H04S 7/30 700/94 |
| 2010/0161087 A1 * | 6/2010 | Lee | G10L 19/167 700/94 |

(Continued)

OTHER PUBLICATIONS

ISO_14496_base_media file_format (Year: 2015).*

(Continued)

*Primary Examiner* — Paul C McCord
(74) *Attorney, Agent, or Firm* — Alston & Bird LLP

(57) ABSTRACT

In an example embodiment, method, apparatus, and computer program product are provided. The apparatus includes at least one processor; and at least one memory including computer program code; the at least one memory and the computer program code configured to, with the at least one processor, cause the apparatus at least to perform: assign one or more audio representations to one or more audio scene entities in an audio scene; generate one or more audio scene entity combinations based on the one or more audio scene entities and the one or more audio representations; and signal the one or more audio scene entity combinations to a client, wherein the one or more audio representations assigned to the one or more audio scene entities cause the client to select an appropriate audio scene entity combination from the one or more audio scene entity combinations to render the audio scene.

21 Claims, 12 Drawing Sheets

(56) References Cited

U.S. PATENT DOCUMENTS

| | | | | |
|---|---|---|---|---|
| 2011/0002469 | A1* | 1/2011 | Ojala | H04S 7/30 |
| | | | | 381/22 |
| 2014/0029502 | A1* | 1/2014 | Hong | H04N 21/2389 |
| | | | | 370/312 |
| 2014/0375889 | A1* | 12/2014 | Cho | H04N 5/268 |
| | | | | 348/706 |
| 2015/0058908 | A1* | 2/2015 | Ko | H04N 21/2383 |
| | | | | 725/116 |
| 2016/0142846 | A1* | 5/2016 | Herre | H04S 3/02 |
| | | | | 381/23 |
| 2016/0204887 | A1* | 7/2016 | Lee | H04L 65/602 |
| | | | | 375/295 |
| 2017/0223429 | A1* | 8/2017 | Schreiner | H04N 21/4363 |
| 2018/0035230 | A1* | 2/2018 | Beack | G10L 19/008 |
| 2018/0091919 | A1 | 3/2018 | Chon et al. | |
| 2018/0114534 | A1* | 4/2018 | Tsukagoshi | H04N 21/85406 |
| 2020/0013426 | A1* | 1/2020 | Sen | G10L 19/18 |
| 2020/0204939 | A1* | 6/2020 | Kim | H04S 3/008 |
| 2020/0367009 | A1* | 11/2020 | Family | H04S 7/30 |

OTHER PUBLICATIONS

Plogsties, Object Interaction use cases (Year: 2014).*

ISO/IED, Information technology—High Efficacy coding and media delivery in heterogeneous environments—Part 3: 3D audio, 23008-3 (Year: 2014).*

"Universal Mobile Telecommunications System (UMTS); LTE; Virtual Reality (VR) Media Services Over 3GPP", ETSI TR 126 918, V15.2.0, Jul. 2018, 118 pages.

Plinge et al., "Six-degrees-of-freedom Binaural Audio Reproduction of First-order Ambisonics with Distance Information", Conference Paper, AES International Conference on Audio for Virtual and Augmented Reality (AVAR), Aug. 20-22, 2018, 11 pages.

"Information Technology—High Efficiency Coding and Media Delivery in Heterogeneous Environments—Part 3: 3D Audio", ISO/IEC DIS 23008-3, Second Edition, Feb. 2019, 798 pages.

"MPEG-I Audio Architecture and Requirements", International Organization for Standardisation, ISO/IEC JTC1/SC29/WG11 MPEG2019/N18158 (Jan. 2019), 6 pages.

* cited by examiner

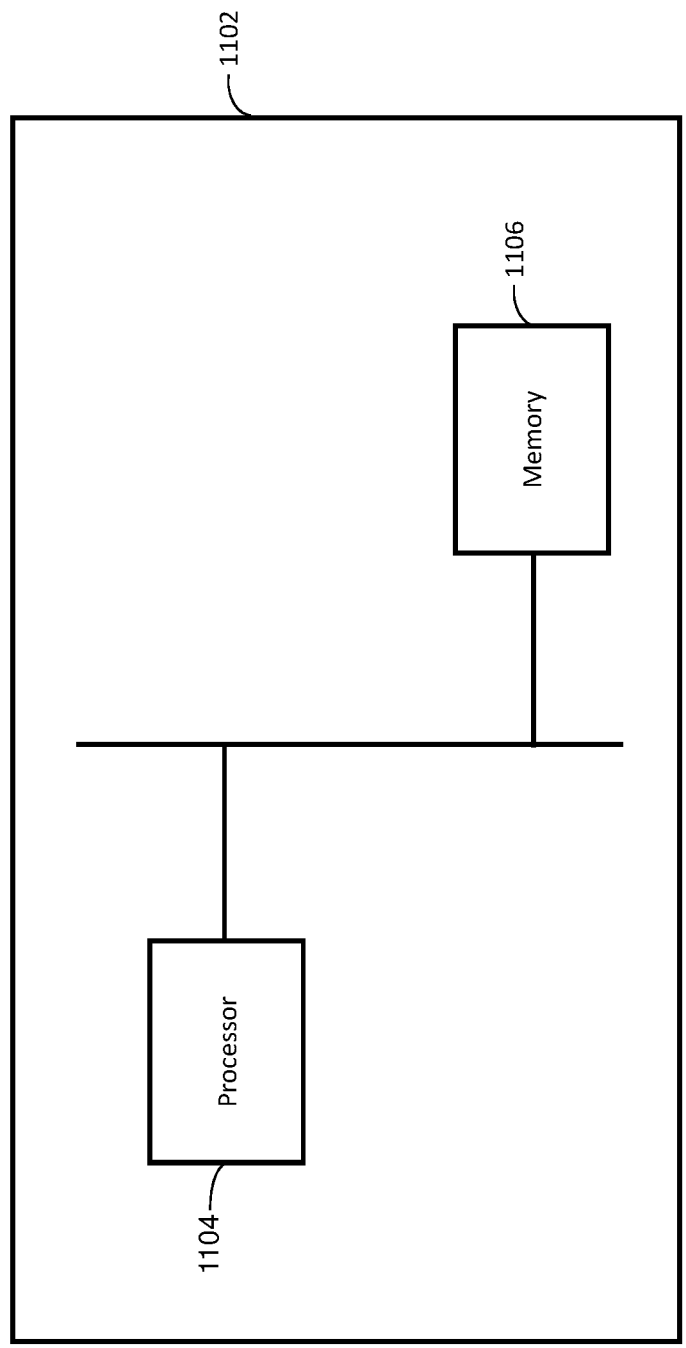

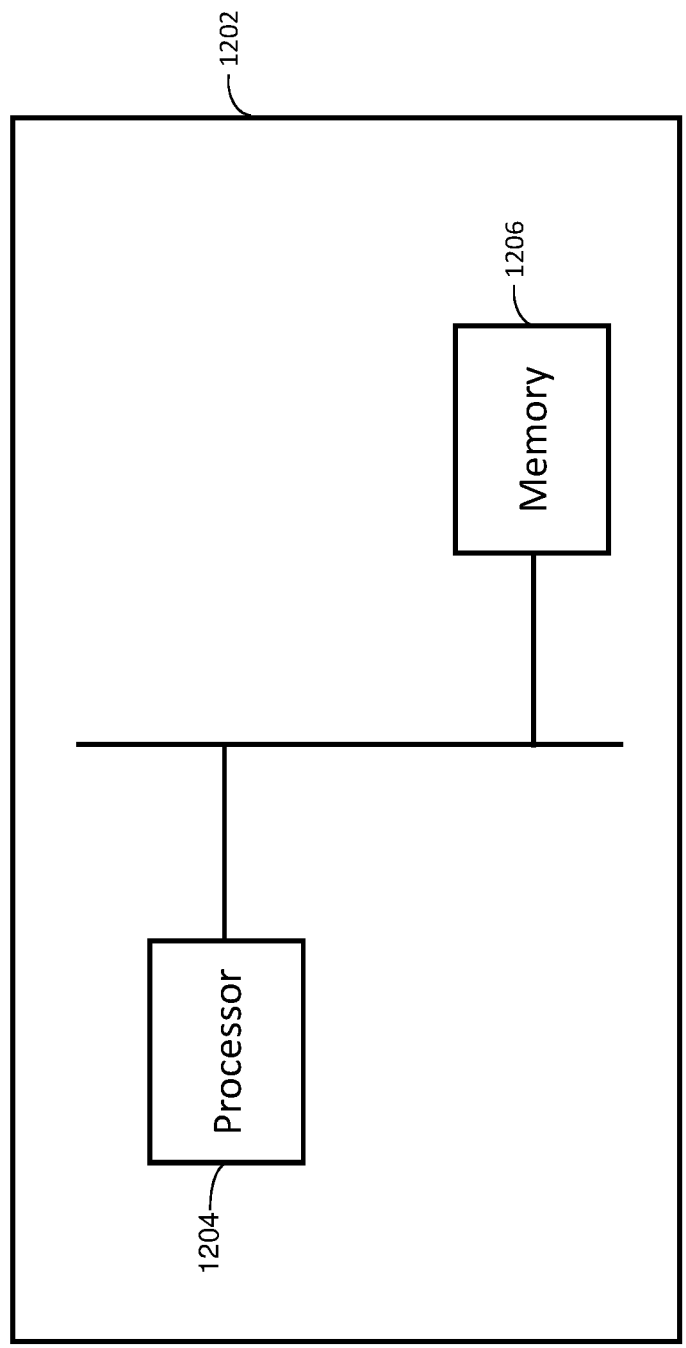

APPARATUS, A METHOD AND A COMPUTER PROGRAM FOR DELIVERING AUDIO SCENE ENTITIES

TECHNICAL FIELD

The present invention relates to an apparatus, a method and a computer program for delivering audio scene entities.

BACKGROUND

Audio scene entities from an audio scene can be represented using different audio representations, for example, objects, channels, or higher order ambisonics. Each of audio representation have their own properties and need to be processed accordingly. Mixing the different audio elements may or may not be permitted, for example, by the content creator to maintain a consistent as well as high quality audio experience.

Some of the audio representations can merged without any adverse impact on the overall audio quality or experience. For example, one object stream may be combined with another object stream. However, combining two loudspeaker outputs having the same audio source may not be trivial.

SUMMARY

Various embodiments of the invention include methods, apparatuses and computer readable media comprising a computer program or a signal stored therein, which are characterized by what is stated in the independent claims. Various details of the invention are disclosed in the dependent claims and in the corresponding images and description.

According to an embodiment, there is provided an apparatus comprising: at least one processor; and at least one memory including computer program code; the at least one memory and the computer program code configured to, with the at least one processor, cause the apparatus at least to perform: assign one or more audio representations to one or more audio scene entities in an audio scene; generate one or more audio scene entity combinations based on the one or more audio scene entities and the one or more audio representations; and signal the one or more audio scene entity combinations to a client, wherein the one or more audio representations assigned to the one or more audio scene entities cause the client to select an appropriate audio scene entity combination from the one or more audio scene entity combinations to render the audio scene.

According to another embodiment, there is provided an apparatus comprising: at least one processor; and at least one memory including computer program code; the at least one memory and the computer program code configured to, with the at least one processor, cause the apparatus at least to perform: receive one or more streams comprising one or more audio scene entity combinations, wherein the one or more audio scene entity combinations comprise one or more audio scene entities from an audio scene, and wherein one or more audio representations are assigned to the one or more audio scene entities, and wherein the one or more audio scene entity combinations are generated based on the one or more audio scene entities and the one or more audio representations; select, based on the one or more audio representations, at least a first stream of the one or more streams that matches requirements for rendering the audio scene; and perform at least one of render, buffer, or render the first stream.

According to still another embodiment, there is provided an apparatus comprising at least one processor; and at least one memory including computer program code; the at least one memory and the computer program code configured to, with the at least one processor, cause the apparatus at least to perform: determine at least one of a position or an orientation of a user; determine one or more audio scene entities that are relevant for an audio scene based on the at least one of the position or the orientation of the user; select audio representations that match requirements to render the audio scene; select a media stream comprising audio scene entities represented in required audio representations; and perform at least one of retrieve, buffer, or render of the audio scene.

In still another embodiment, there is provided an apparatus comprising: at least one processor; and at least one memory including computer program code; the at least one memory and the computer program code configured to, with the at least one processor, cause the apparatus at least to perform: generate a miscibility label for each audio scene entity combination of one or more audio scene entity combinations, wherein the one or more audio scene entity combinations comprise one or more audio scene entities from an audio scene, and wherein one or more audio representations are assigned to the one or more audio scene entities, and wherein the one or more audio scene entity combinations are generated based on the one or more audio scene entities and the one or more audio representations; and generate a miscibility matrix based on the miscibility label assigned to the each combination, wherein the miscibility matrix indicates audio data corresponding to which miscibility labels can mixed together and audio data corresponding to which miscibility labels cannot be mixed together.

In still another embodiment, there is provided a method, comprising: assigning one or more audio representations to one or more audio scene entities in an audio scene; generating one or more audio scene entity combinations based on the one or more audio scene entities and the one or more audio representations; and signalling the one or more audio scene entity combinations to a client, wherein the one or more audio representations assigned to the one or more audio scene entities cause the client to select an appropriate audio scene entity combination from the one or more audio scene entity combinations for rending the audio scene.

In still another embodiment, there is provided a computer program product comprising at least one computer-readable storage medium, the computer-readable storage medium comprising a set of instructions, which, when executed by a processor, cause an apparatus to at least perform: assign one or more audio representations to one or more audio scene entities in an audio scene; generate one or more audio scene entity combinations based on the one or more audio scene entities and the one or more audio representations; and signal the one or more audio scene entity combinations to a client, wherein the one or more audio representations assigned to the one or more audio scene entities cause the client to select an appropriate audio scene entity combination from the one or more audio scene entity combinations for rending the audio scene.

BRIEF DESCRIPTION OF THE DRAWINGS

For understanding of example embodiments of the present invention, reference is now made to the following descriptions taken in connection with the accompanying drawings in which:

FIG. 11 illustrates an apparatus, in accordance with an embodiment; and

FIG. 12 illustrates an apparatus, in accordance with another embodiment.

DETAILED DESCRIPTON OF VARIOUS EXAMPLE EMBODIMENTS

In the following, several embodiments will be described in the context of six degree for freedom (6DOF). It is to be noted, however, that while some of the embodiments are described relating to certain audio coding technologies, the invention is not limited to any specific volumetric audio technology or standard. In fact, the different embodiments have applications in any environment where different representations providing different levels of experience of volumetric audio scene is required to be conveyed. The different levels of experience can be related to the ability to interact with one or more audio sources present in the audio scene, response to user or listener's movement, etc.

Figure 1:
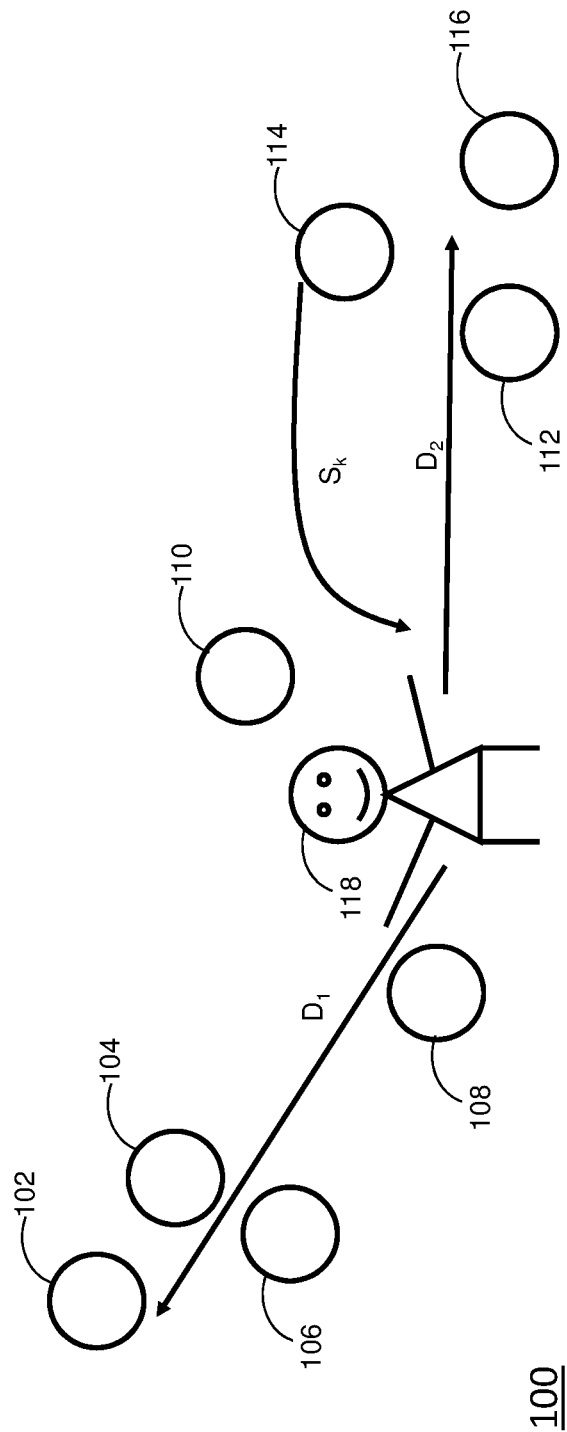
FIG. 1 illustrates an example audio scene, in accordance with an embodiment.

FIG. 1 illustrates an example audio scene 100, in accordance with an embodiment. The audio scene 100 includes various audio scene entities, which may also be referred as audio sources, contributing sources, or audio elements in some embodiments. In this embodiment, the audio scene 100 is shown to include audio scene entities 102, 104, 106, 108 110, 112, 114, and 116. The audio scene may also include a user, for example, a user 118. The audio scene entities 102, 104, . . . and 116, may be represented using different audio representations, for example, higher order ambisonics (HOA), channels, or objects. The audio representations may also be referred to as audio representation format in some embodiments. The audio scene entities may be represented with temporally changing use of different combinations of audio representations. This is particularly useful in representing an audio scene with six degrees of freedom (6DOF).

Audio scene with 6DOF can be complex. This requires efficient delivery to scale with large number of audio scene entities which represent the audio scene. As described above, the audio scene entities may be represented by using one or more objects, channels, and/or HOA representations.

To optimally utilize the available bandwidth, audio entities in the audio scene may be delivered as different representations. Some audio scene entities as objects whereas others as HOA or channels. Objects, which may also be referred to as audio objects in some embodiments, may be used to provide high quality and control. For example, audio objects may be used for interaction and highly perceptual distance rendering effect. For example, if a user is walking towards an audio scene entity that audio scene entity may become louder. The audio scene entities which are not required to be as responsive or do not require to be interactive, for example, switched on/off or moved, such entities may be delivered in a bandwidth efficient manner while providing adequate perceptual quality, for example, audio scene ambience.

Consumption of the 6DOF content, which may be audio, visual, or audio-visual, can be highly dynamic. Furthermore, the freedom of user movement further increases the dynamic nature of the content. For example, if the user translates or if the audio scene entity position is dynamic in the content, the 6DOF content will be dynamic. Such a dynamic situation necessitates a need to combine different audio scene entities with temporally changing use of different combinations of audio representations. For example, now referring again to FIG. 1, the user 118 may decide to move in either in directions D1 or D2, which can result in different audio sources becoming more important, and requiring interactivity enabled. For example, if the user 118 moves in the direction $D_1$, the audio scene entities 102, 104, and 106 may become more important as compared to the audio scene entities 108, 110, 112, 114, and 116. Accordingly, once the user 118 is closer to the audio scene entities 102, 104, and 106, representing these audio scene entities using objects will provide high quality and control. Similarly, if the user 118 starts moving towards the direction $D_2$, the audio scene entities 112, 114, and 116 will become more relevant as compared to the audio scene entities 102, 104, 106, 108, and 110. As a result, representing these audio scene entities 112, 114, and 116 by using objects will provide high quality and control.

In another example, if the audio scene entity 114 starts moving towards the user 118, for example, in a direction $S_k$, the audio scene entity 114 (along with the audio scene entities 108 and 110) becomes more relevant as compared to the audio scene entities 102, 104, 106, 112, and 116. Accordingly, the audio scene entities 108, 110, and 114 are represented using objects to provide better quality and control.

Streaming Overview of the Audio Entities

DASH is a commonly used protocol for streaming audio-visual content. The DASH delivery has many benefits such as scalable hosting and delivery. For lower latency streaming applications, CMAF streaming or RTSP/RTP streaming may be used. Streaming clients typically buffer content for longer durations to provide a glitch-free experience for consumption the audio-visual content. Due to dynamic nature of the 6DOF content, there is a risk of a subset of the buffered content or already requested content becoming unusable.

Longer the temporal duration of the buffered 6DOF content the client has, lower is the risk of not having a glitch-free experience. However, the risk of buffered content becoming unusable is higher with the longer temporal duration of the buffered content.

Figure 2:
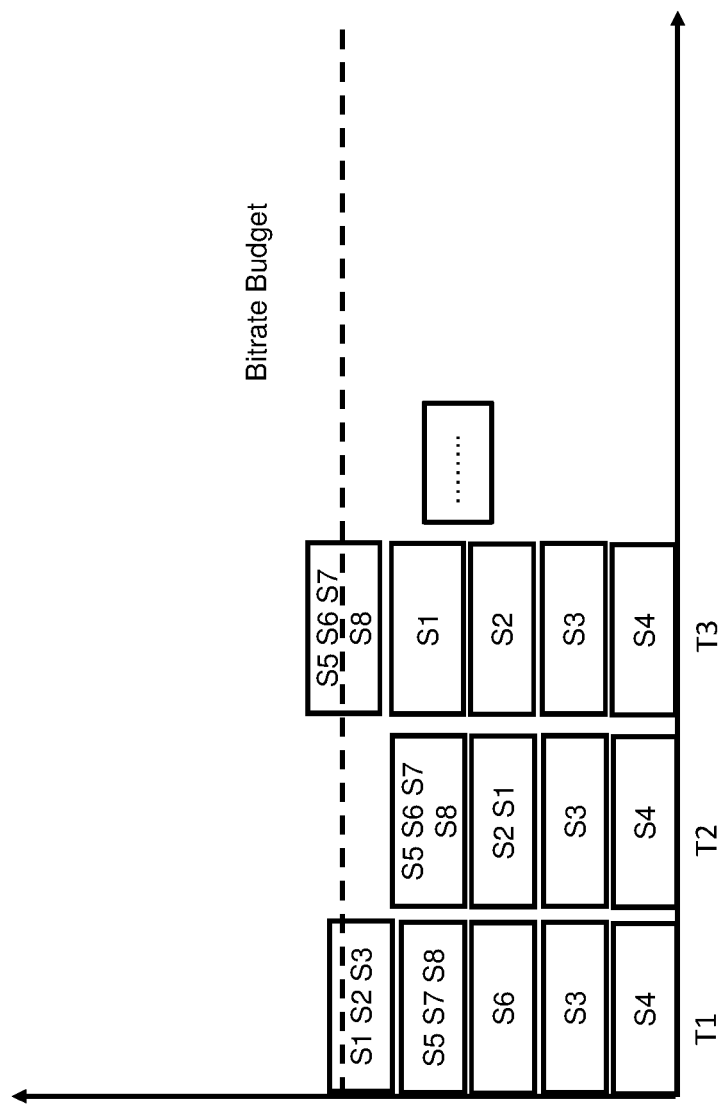
FIG. 2 illustrates an example delivery change, in accordance with an embodiment.

As described in previous paragraphs, there is a need to dynamically change audio representations of different audio scene entities due to change in the audio scene or due to change in a user position in the audio scene. The change in the audio scene may be, for example, due to an audio scene entity moving closer to or away from the user. The change in the user position may be due to the user moving in one direction or other. These changes require a change in the delivery scheme of the audio scene entities. An example of delivery change is shown in FIG. 2. As an example, FIG. 2 is shown to include audio elements S1, S2, S3, S4, S5, S6, S7, and S8. FIG. 2 indicates the audio elements S3, S4 and S6 are delivered as an object audio during a temporal segment T1, whereas in a subsequent temporal segment, T2, only the audio elements S3 and S4 is delivered as object audio. During the temporal segment T1, the audio element S5 is delivered as part of a channel downmix comprising the audio elements S5, S7, and S8; and the audio element S1 is delivered as part of a channel downmix comprising the audio elements S1, S2, and S3. During the temporal segment T2, the audio element S6 is delivered as part of a channel downmix comprising the audio elements S5, S6, S7 and S8; and the audio element S2 is delivered as part of a channel downmix comprising the audio elements S2 and S1. Similarly, during a temporal segment T3, the audio elements S1, S2, S3, and S4 are delivered as object audio, and the audio element S6 is delivered as part of a channel downmix comprising the audio elements S5, S6, S7 and S8. The choice of selection is based on client priorities which are either implementation specific or informed by content creator preference metadata.

Figure 3:
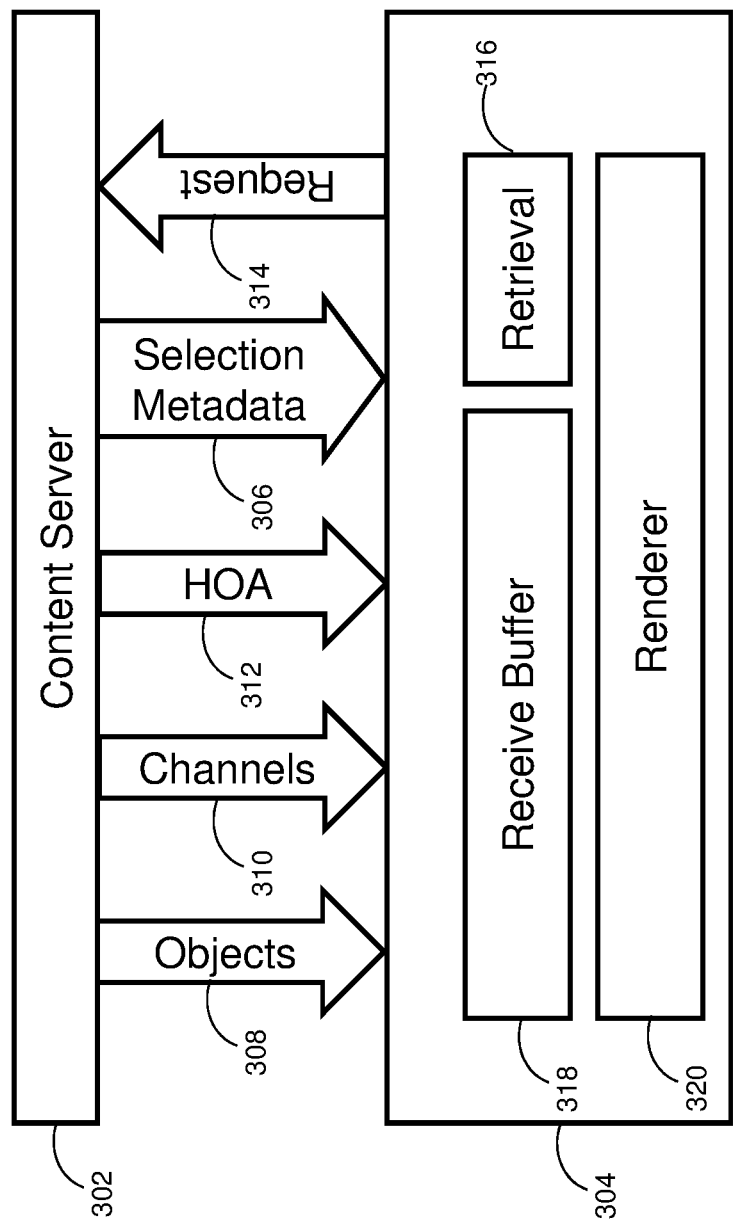
FIG. 3 illustrates an overview of an example 6DOF audio delivery and rendering system, in accordance with an embodiment.

FIG. 3 illustrates the data exchange between a content server 302 and a client 304, in accordance with an embodiment. The content server 302 holds a content describing 6DOF scene. Audio scene entities may comprise, diegetic sounds, non-diegetic, or both, and may be represented in different audio representation formats. In this example, the audio is delivered as a combination of one or more of the following audio formats:

Audio objects (object rendering);
  Audio channels (suitable for loudspeaker rendering); and/or
  Higher Order Ambisonics (HOA rendering)

Each audio format is rendered with the appropriate means to the desired output format. The output format can be head-tracked binaural output or loudspeaker output. Head-tracked binaural audio is experienced by the user by wearing a pair of headphones and a head-mounted-display (HMD), or a single integrated device with head-tracking and headphone output functionality such as a mobile phone. Loudspeaker output is typically experienced by a user via physical loudspeakers arranged into an immersive setup, such as ones described in the MPEG Coding-Independent Code Points (CICP) layouts. Loudspeaker rendering can be accompanied by user head position tracking via an HMD, and adapting the loudspeaker rendering to account for changes in the listener position in the reproduction. For example, audio objects may be rendered with object rendering means, comprising, for example, distance rendering with distance attenuation, delay control, and virtual acoustics comprising reverberation. Spatialization can be done with head-related-transfer-function (HRTF) filtering for headphones, or with vector-base amplitude panning (VBAP) for loudspeakers. Audio channels can be rendered to binaural or loudspeaker output in a similar manner as audio objects, or with dedicated audio channel rendering means. HOA signals can be rendered to binaural output or loudspeaker output with known means, such as the All-round Ambisonic Decoding for loudspeakers. For example, MPEG-H 3D audio has one example of renderers which can be utilized for MPEG-I 6DoF audio rendering by implementing extensions using known technologies for supporting rendering during listener translation.

In addition to audio signals, the content server 302 may also contain the representation description of an audio scene, for example, the audio scene 100. The MPEG-H standard, [specification ISO/IEC 23008-3: https://www.iso.org/standard/74430.html], supports describing an audio scene delivery with different representation formats. However, the current specification does not provide any information regarding which audio scene entities, for example audio sources, ambience sounds, non-diegetic sounds are being delivered. The MPEG-H specification currently does not support any aspect of 6DOF translation for audio content, as the audio content of 6DOF content delivered supports only three degrees of freedom (yaw, pitch, roll). However, it is important to support 6DOF translation where the currently available content does not cover the full 6DOF scene. To support 6DOF content translation, a new box, 'maeS' with following description, is added to the 'maeI' box in MPEG-H:

Box Type: 'maeS'
  Container: MHA scene information ('maeI')
  Mandatory: Yes
  Quantity: Zero or one This box provides information about contributing scene elements/audio scene entities in the maeG box, contained in an MPEG-H 3D Audio (MHA) track expected to support 6DOF.

Following describes an example of the syntax to support 6DOF by extending the MPEG-H bitstream:

```
aligned(8) class MHASourceDefinitionBox( )extends FullBox('maeS',
    version = 0, 0) {
        unsigned int(8) mae_audioSceneID;
        unsigned int(1) reserved = 0;
        unsigned int(7) mae_numGroups;
        for (i = 0; i < mae_numGroups; i++) {
            unsigned int(1) reserved = 0;
            unsigned int(7) mae_groupID;
            for (i = 0; i < mae_numGroups; i++) {
                unsigned int(7) mae_scene_entity_ID;
                unsigned int(7) mae_scene_entity_priority;
                unsigned int(2) mae_scene_entity_represent_type;
            }
        }
    }
```

Where:
  mae_audioSceneID field defines an identity (ID) for a current audio scene. This field can take values between 0 and 255. A value of 0 means that the ID shall not be evaluated;
  mae_numGroups field signals a number of audio scene entity combinations in the overall audio scene, for example, total number of audio scene entity combinations in a main stream plus all possible additional streams. Whether a particular stream is main stream is defined by isMainStream flag in mae_AudioSceneInfo structure, which is part of mpegh3daConfig-Extension( )structure. The maximum number of audio scene entity combinations may be defined by a content creator. In an embodiment, this field may take values between 0 and 127, representing a maximum number of 127 groups are assumed;

mae_groupID field uniquely defines an ID for a group of metadata elements. In an embodiment, this field can take values between 0 and 126;

mae_scene_entity_ID field uniquely defines an ID for scene entities as described in the scene description. In an embodiment, this field can take values between 0 and 126;

mae_scene_entity_representation_type field defines the representation format of the audio scene entities. In an embodiment, the value 0 is reserved, 1 means audio object representation, 2 means channel representation and 3 represents HOA representation; and mae_scene_entity_priority field defines a priority of the audio scene entity referred by the mae_scene_entity_ID. In an example, larger number represents the higher priority unless specified otherwise.

In an embodiment, the audio scene entities could also be packed as an MHAS packet. The MHAS packet could be referred to as scene description packet. The scene description packet could be delivered together with the SYN packet or with the CFG packet.

In yet another embodiment, the audio scene entities could be included in the mae_GroupDefinition( ) structure. A combination of mae_groupID and mae_audioElementID could be incorporated in different audio scene entity combinations to indicate the presence of overlapping content between them. In case of multiple scenes being present in the MPEG-H file or stream, a combination of mae_groupID, mae_audioElementID, and mae_audioSceneInfoID may be used to indicate the presence of overlapping content between the multiple scenes.

Referring again to FIG. 3, it illustrates the data exchange between the content server 302, for example, MPD sever in case of DASH delivery, and a client 304, for example, a 6DOF audio player. Depending on the client preferences and user position, content selection information comprising of contributing scene entities miscibility labels is delivered as a selection metadata 306, in addition to the audio scene representations in different formats, for example, objects 308, channels 310, and HOA 312. Subsequently, the client 304 may change the retrieval choice, via a request 314. The retrieval selection is implemented by a retrieval module 316 whereas a receive buffer 318 stores the audio data to be used by an audio renderer 320. This is especially useful in deployments without any explicit scene description in the form of scene graph or any such methodology.

Figure 4:
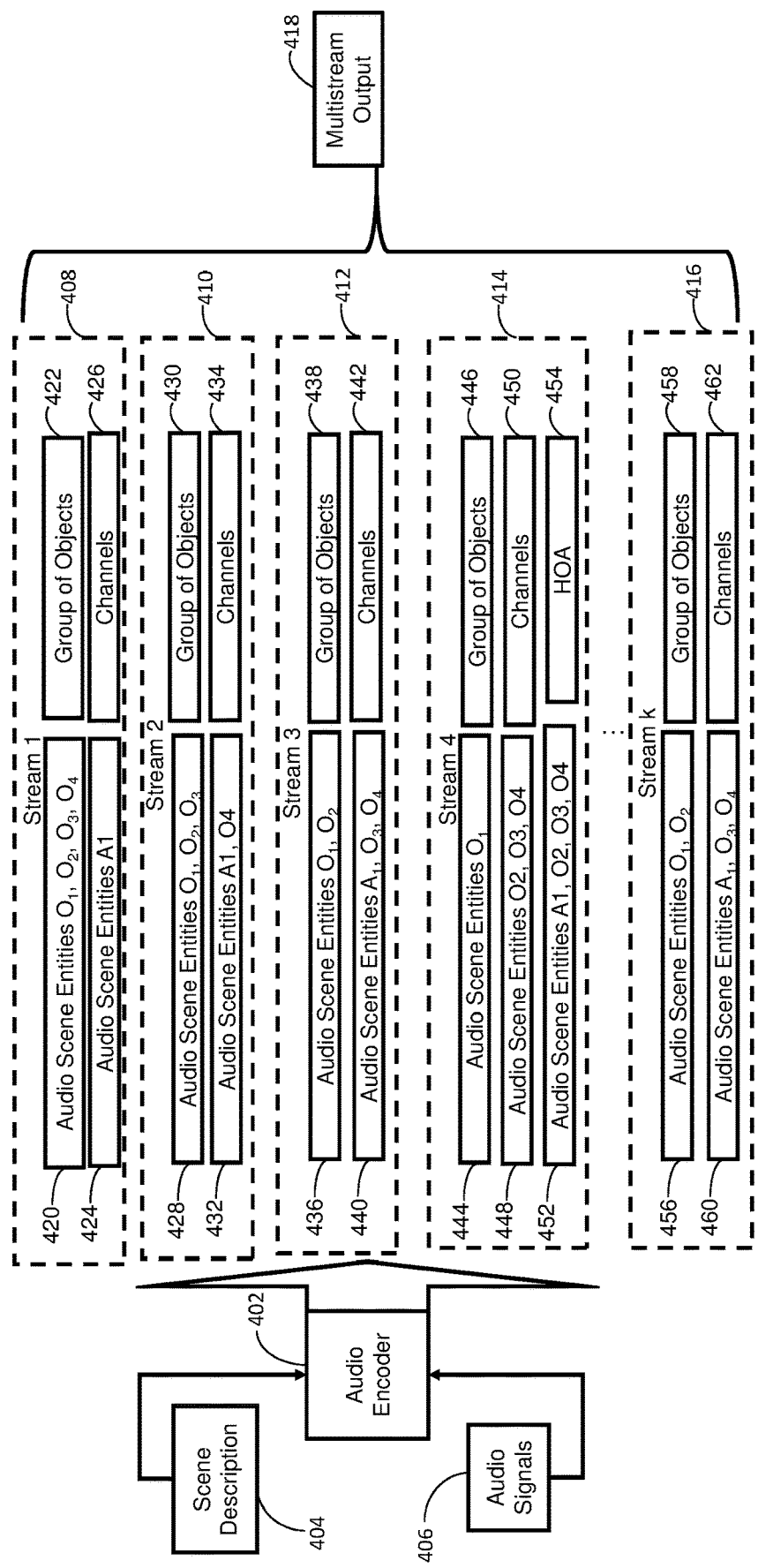
FIG. 4 illustrates an example 6DOF content creation pipeline, in accordance with an embodiment.

FIG. 4 illustrates an example 6DOF content creation pipeline, in accordance with an embodiment. The pipeline utilizes the different content representations in conjunction with contributing audio scene elements description. The objective of this step is to generate the audio scene such that the client can consume the audio scene by requesting audio scene entities in a format which is suitable according to the rendering priorities. In an embodiment, the rendering priorities description may be decided by a client or defined by the content creator.

In this embodiment, the audio scene includes 5 audio scene entities, for example, audio scene entity 1, audio scene entity 2, audio scene entity 3, audio scene entity 4, and audio scene entity 5. It would be apparent the audio scene may include more than or less than 5 scene entities. Audio scene entities name, for example, audio scene entity 1 to audio scene entity 5 as used for explanation purpose, and any other naming convention may be used. In following paragraph 6DOF content creation pipeline will be explained with help of these audio entities.

An audio encoder 402, for example, a 6DOF audio encoder, receives a scene description 404, and an audio signal 406. In an embodiment, the audio encoder 402 assigns labels to the audio scene entities 1, 2, 3, 4, and 5. Each audio scene entity is assigned a unique label. For example, the audio scene entity 1 is assigned a label $O_1$, the audio scene entity 2 is assigned a label $O_2$, the audio scene entity 3 is assigned a label $O_3$, the audio scene entity 4 is assigned a label $O_4$, and the audio scene entity 5 is assigned a label $A_1$.

Once the labels are assigned to the audio scene entities, the 6DOF audio encoder will assign one or more audio representations to the audio scene entities. Example of audio representations include, audio objects, HOA, and channels. The 6DOF encoder also generates one or more combinations of the audio scene entities based on the one or more audio representations, for example, the one or more audio scene entity combinations. In some embodiments, audio scene entity combination may be referred to as a combination, for example, the audio scene entity combination 408 may be referred to as combination 408. For example, in the combination 408 the audio scene entities $O_1$, $O_2$, $O_3$, and $O_4$ may be assigned audio object representation format; and audio scene entity $A_1$ may be assigned channels representation format. In another combination 410, the audio scene entities $O_1$, $O_2$, and $O_3$, may be assigned audio object representation format; and the audio scene entities $A_1$ and $O_4$ may be assigned channels representation format. In a yet another combination 412, the audio scene entities $O_1$, and $O_2$ may be assigned audio object representation format; and the audio scene entities $A_1$, $O_3$, and $O_4$ may be assigned channels representation format. In a still another combination 414, the audio scene entity $O_1$, may be assigned audio object representation format; the audio scene entities $O_2$, $O_3$, and $O_4$ may be assigned channels representation format; and the audio scene entities $A_1$, $O_2$, $O_3$, and $O_4$ are assigned HOA representation format. In a further combination 416, which may be a $k^{th}$ combination, the audio scene entities $O_1$, and $O_2$ may be assigned audio object representation format; and the audio scene entities $A_1$, $O_3$, and $O_4$ may be assigned HOA representation format. It would be apparent that the above-mentioned audio scene entity combinations are non-exhaustive, and more combination of the audio scene entities may be generated based on the one or more audio representations. In an embodiment, total number of audio scene entities combinations that are generated may be less than the maximum number of possible combinations. Total or maximum number of combinations may be defined by a content creator. For example, the content creator may decide in what format which audio scene entities are made available.

These audio scene entity combinations are signalled to a client. In an embodiment, an independent stream is generated for each audio scene entity combination. For example, independent streams 1, 2, 3, 4 . . . , and k are generated for the audio scene entity combinations 408, 410, 412, 414, and 416 respectively. Accordingly, a multi-stream output 418 is generated by the audio encoder 402. In an embodiment, the audio representations assigned to audio scene entities cause the client to select an appropriate audio scene entity combination based on the requirement of the client. Accordingly, an independent stream including the appropriate audio scene entity combination is retrieved by the client for rendering the audio scene.

In an embodiment, audio scene entities in an audio scene entity combination that are assigned the same audio representation are grouped to form audio scene entity group. For example, in the audio scene entity combination 408, the audio scene entities $O_1$, $O_2$, $O_3$, and $O_4$ are assigned audio object representation format; and the audio scene entity $A_1$ is assigned channels representation format. Accordingly, the audio scene entities $O_1$, $O_2$, $O_3$, and $O_4$ are grouped to form an audio scene entity group 420, which is represented by group of objects 422; the audio scene entity $A_1$ forms an audio scene entity group 424, which is represented by channels 426. Similarly, in the audio scene entity combination 410, the audio scene entities $O_1$, $O_2$, and $O_3$, are grouped to form an audio scene entity group 428, which is represented by a group of objects 430; and the audio scene entities $A_1$ and $O_4$ are grouped to form an audio scene entity group 432, which is represented by channels 434. Similarly, in the audio scene entity combination 412, the audio scene entities $O_1$, and $O_2$ are grouped together to form an audio scene entity group 436, which is represented by a group of objects 438; and the audio scene entities $A_1$, $O_3$, and $O_4$ are grouped to form an audio scene entity group 440, which is represented by channels 442. In the audio scene entity combination 414, the audio scene entity $O_1$ forms an audio scene entity group 444, which is represented by a group of objects 446; the audio scene entities $O_2$, $O_3$, and $O_4$ are grouped to form an audio scene entity group 448, which is represented by channels 450; and the audio scene entities $A_1$, $O_2$, $O_3$, $O_4$ are grouped to form an audio scene entity group 452, which is represented by an HOA 454. In the audio scene entity combination 416, the audio scene entities $O_1$, and $O_2$ are grouped to form an audio scene entity group 456, which is represented by group of objects 458; and the audio scene entities $A_1$, $O_3$, and $O_4$ are grouped to form an audio scene entity group 460, which is represented by channels 462.

Figure 5:
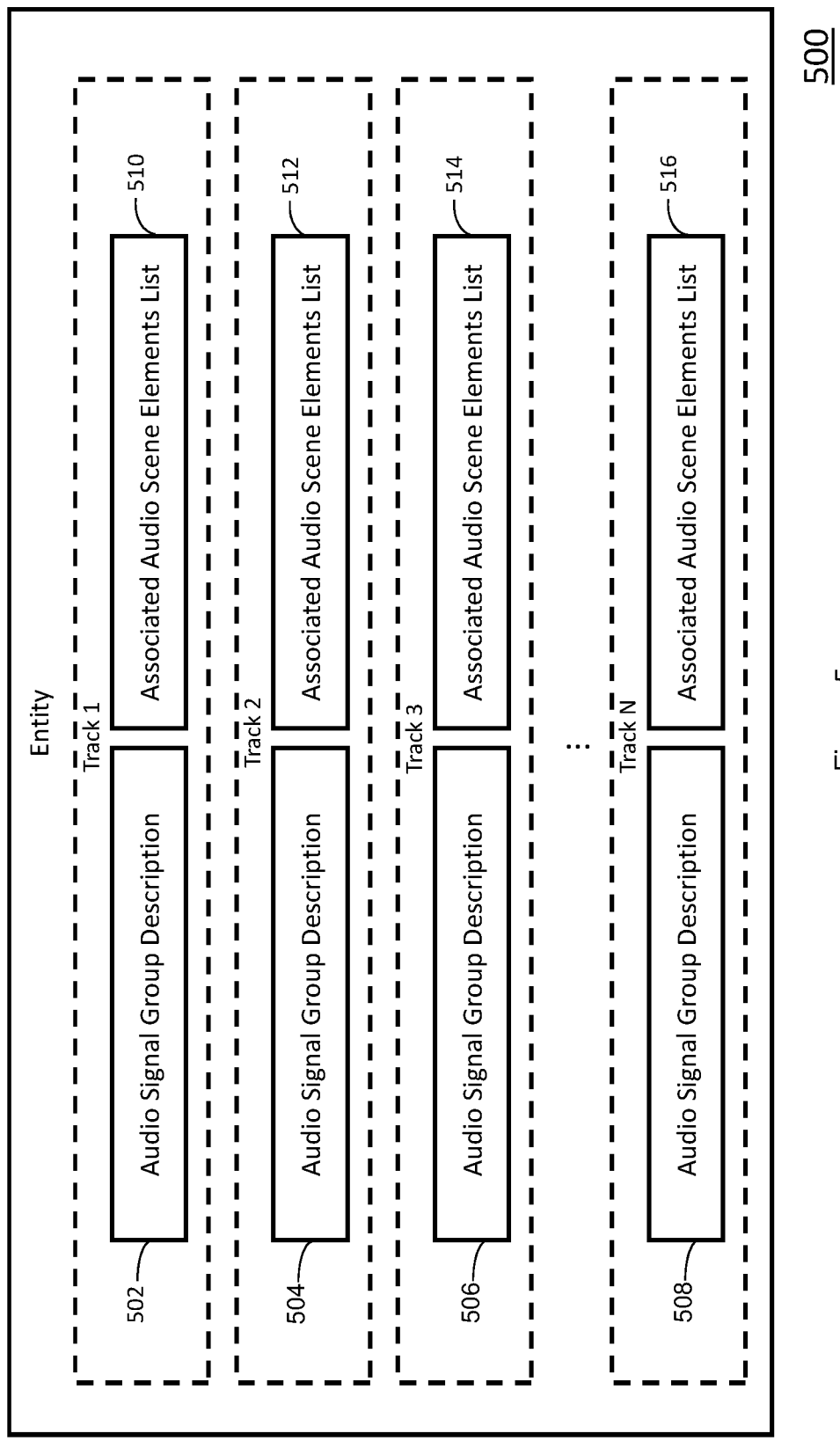
FIG. 5 illustrates an example entity, in accordance with an embodiment.

FIG. 5 illustrates an example of an entity 500, in accordance with an embodiment. The entity 500 may be used to provide description of the audio scene entities in the audio scene entity group, and information about the audio representation assigned to the audio scene entity group to a client, for example the client 304. In an embodiment, the entity 500 may be defined as contributing scene entity (CSCE). One example is to create a new MHAS packet at specified intervals. This could be described using a new DASH descriptor with 'coso'

```
<SupplementalProperty
schemeIdUri="urn:mpeg:mpegh:scenecontribution:2018" value="coso">
    <SignalGroupTypeHOA scene_elements="10"/>
    <SignalGroupTypeChannels scene_elements="1,2,..."/>
    <SignalGroupTypeObjects scene_elements="3,5,..."/>
</SupplementalProperty>
```

The 'coso' descriptor can be used at representation levels or at the adaptation set level. This property shall be present in an audio adaptation set or representation set of DASH MPD. The SupplementalProperty provides information about the contents of the audio adaptation set or representation set. The SupplementalProperty has three elements SignalGroupTypeHOA, SignalGroupTypeChannels and SignalGroupTypeObjects. Each has an attribute consisting of the list of scene entity identifier. The scene entity identifiers are matching with the source definition box, providing information about the contributing sources for one or more audio signal group.

In this embodiment, the entity 500 includes an audio signal group description 502 for track 1, an audio signal group description 504 for track 2, an audio signal group description 506 for track 3, . . . , and an audio signal group description 508 for track N. Track may be referred to as stream in some embodiments. The entity 500 also includes an associated audio scene element list 510, an associated audio scene element list 512, associated audio scene element list 514, and an associated audio scene element list 516. The audio signal group descriptions 502, 504, 506, and 508 are associated with the associated audio scene element lists 510, 512, 514, and 516 respectively. An audio signal group description provides details about audio representations available in a track. An associated audio scene elements list provides details about audio scene elements or audio labels that are associated with a particular audio representation in the track.

For example, the audio signal group description 502 may include objects and HOA audio representation formats; and the associated audio scene element list 510 may indicate that the audio labels O1, O2, and O3 (or the audio scene entities with labels O1, O2, and O3) are associated with audio objects format, and the audio labels O4 and A1 (or the audio scene entities with labels O4 and A1) are associated with HOA representation format. The labels O1, O2, O3, and O4, and A1 represent different audio scene elements in an audio scene.

In an example, the entity 500 may cause a client to select an appropriate stream that includes audio scene entities represented in audio representations that meet the requirements of the client.

Figure 6:
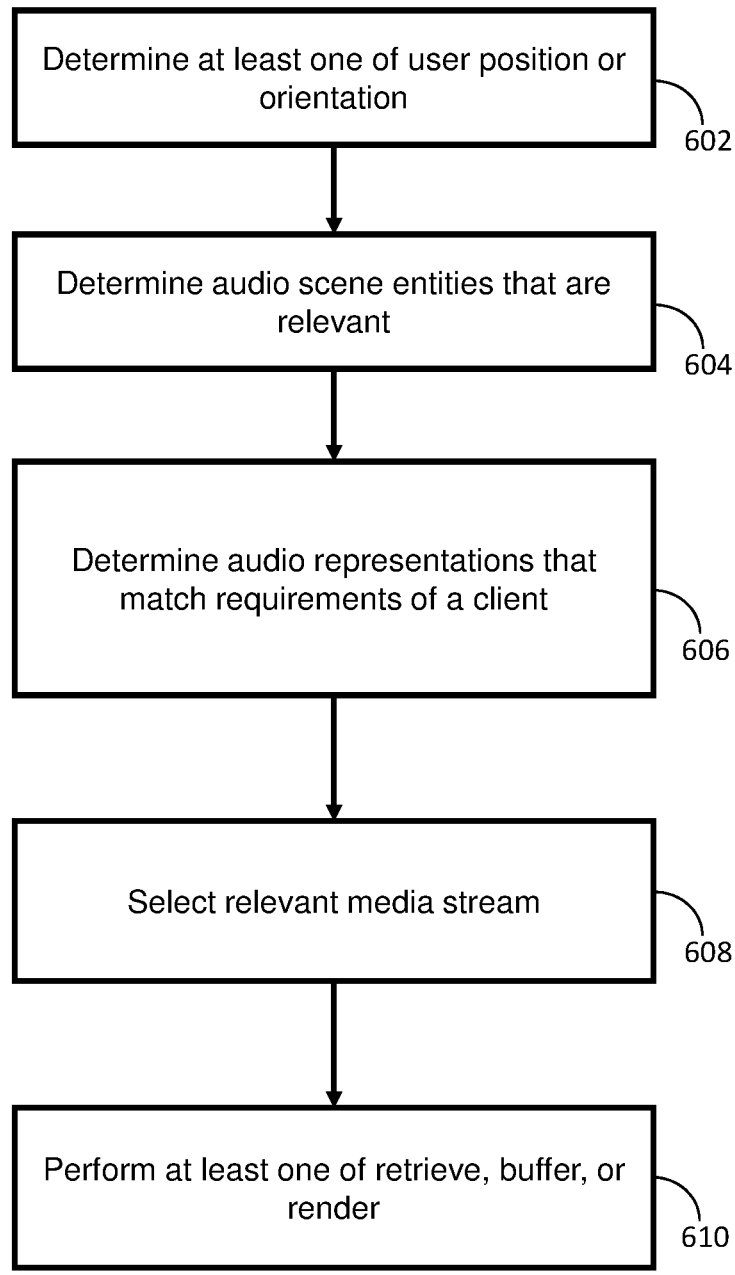
FIG. 6 illustrates a flow chart for a method of delivering audio scene entities, in accordance with an embodiment.

FIG. 6 illustrates a flow chart for a method of delivering audio scene entities, in accordance with an embodiment. The implementation uses contributing sources from the audio scene in audio signals. At 602, a position and/or orientation of a user is determined. The user position or orientation may be determined using any suitable 6DOF tracking mechanism to determine the user position and orientation. At 604, audio scene entities that are relevant are determined based on the position and the orientation of the user. In an example, the audio scene entities that are closer to the user may be more relevant as compared to the entities that are farther from the user. In another embodiment, audio scene entities based on proximity to user position or in line of the user orientation may be considered as more relevant. However, there may be other content creator provided information which can be exploited to determine the relevance and priority of the audio scene entities in the audio scene. At 606, audio representations that match the requirements of the client for rendering the audio scene are determined. Some examples of the requirements include, but are not limited to, audio scene entity priority, perception needs, available bandwidth, and available computing resources at the client. At 608, a relevant media stream is selected. The relevant media stream includes the audio scene entities being represented in audio representations that meets the client requirements of the client.

For example, referring to FIG. 1, if the user moves towards the audio scene entities 108 and 110, it would be preferred to represent the audio scene entities 108 and 110 by using audio object format. Further, the client may require the background sound to be represented as channels.

Accordingly, a stream which includes the audio scene entities being represented as the audio objects, and the background sound being represented at the channels may be selected. In an embodiment, this enables greater freedom of content creation as well as for player implementations to devise their own implementation logic. At 610, the selected stream is retrieved, buffered, and/or rendered.

Figure 7:
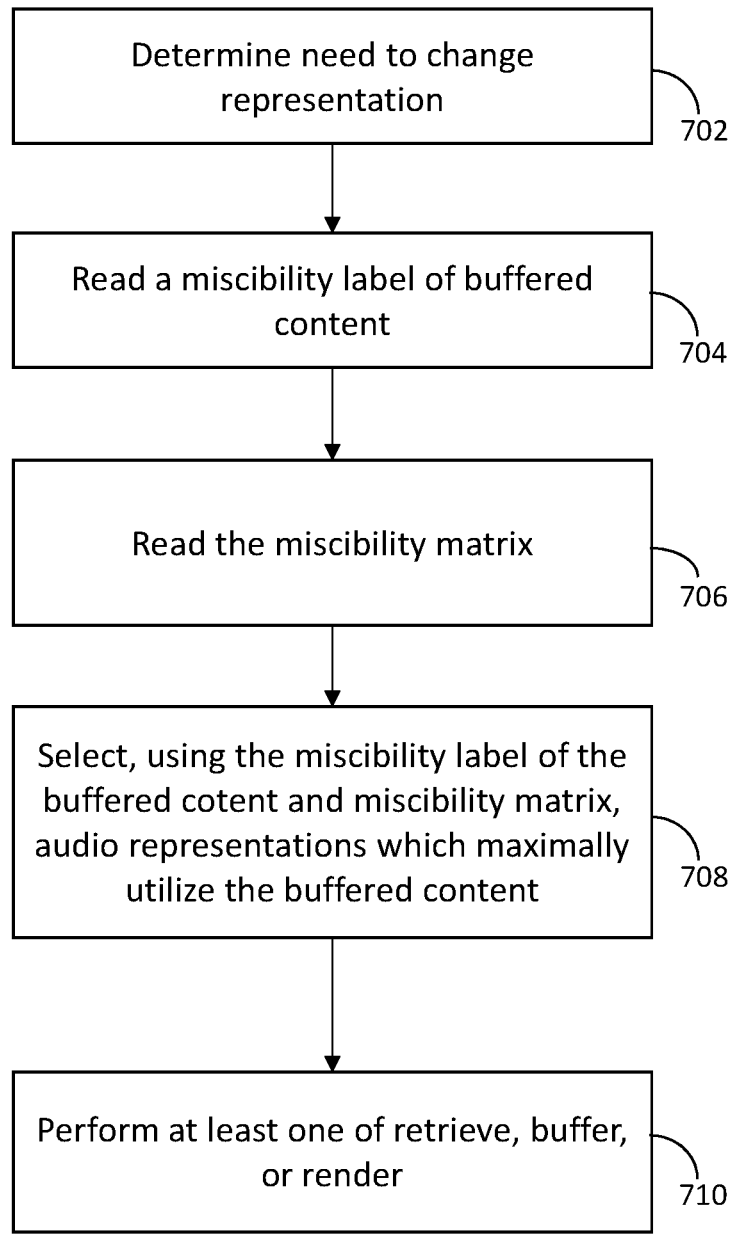
FIG. 7 illustrates a flow chart for a method of delivering audio scene entities, in accordance with another embodiment.

FIG. 7 illustrates a flow chart for a method of delivering audio scene entities, in accordance with another embodiment. References may be made to FIG. 1 to describe some examples of this embodiment. This embodiment utilizes miscibility labels for 6DOF audio rendering clients. The miscibility labels of different audio representations are used to create a desired audio scene rendering. One of the objectives is the maximal re-use of already buffered content in a receive buffer of a client, for example, an audio player. This should be achieved such that transition to new representation selections from the current representations should be seamless. This is done by signaling the miscibility label as a separate box in the audio delivery stream. This is specifically useful when using different representation permutations.

At 702, need to change representations for audio scene entities is determined. For example, if the user start moving in the direction D2, the audio scene entities 112, 114, and 116 may become more relevant as compared to the other entities in the audio scene 100. Accordingly, there may be a need to change the representations of the audio scene entities 112, 114, and 116.

In an embodiment, miscibility label is assigned to each audio scene entity combination. In this embodiment, a miscibility matrix is generated based on the miscibility label assigned to each of the audio scene entity combination. At step 704, a miscibility label of the buffered content is read. At step 706, a miscibility matrix is read. In an embodiment, a miscibility label of different audio scene entity combinations may also be read. In an embodiment, the miscibility matrix indicates audio data corresponding to which miscibility labels can be mixed together and audio data corresponding to which miscibility labels cannot be mixed together. In an embodiment, miscibility labels are signaled in an MPEG-DASH media presentation description. In embodiment, the miscibility matrix is signaled in a header of an independent stream as a part of the initialization segment.

At 708, a stream including an audio scene entity combination which maximally utilize the buffered content is selected by using the miscibility label of the buffered content and miscibility matrix. In an embodiment, audio representations associated with audio scene entities in the scene entity combination cause the client to select the stream that maximally utilize the buffered content. At 710, the selected stream is retrieved, buffered, and/or rendered.

Use of miscibility matrix and miscibility labels is further explained in following paragraphs. Consider an example in which:

In stream 1, the audio scene entity O1 is delivered as object whereas the audio scene entities O2, O3, O4 are delivered as channel downmix. Miscibility label of the stream 1 is L1;

In stream 2, the audio scene entities O1 and O2, are delivered as object whereas the audio scene entities O3 and O4 are delivered as channel downmix. Miscibility label of the stream 2 is L2;

In stream 3, the audio scene entity O2 is delivered as object whereas the audio scene entities O1, O3, and O4 are delivered as HOA. Miscibility label of the stream 3 is L3; and Ambience delivered in stream 4. Miscibility of stream 4 is L4.

An example of the miscibility matrix comprising miscibility labels of streams 1, 2, and 3; and indicating the miscibility of the streams with respect to each other is provided below in Table 1. Numerical value '1' in the table indicates corresponding labels may be mixed. In an embodiment, the miscibility matrix may be generated based on the requirements provided by a content creator. For example, the content creator may suggest that audio scene may not meet a threshold audio quality, set by the content creator, if certain labels are mixed.

TABLE 1

| Miscibility label | To L1 | To L2 | To L3 | To L4 |
|---|---|---|---|---|
| From L1 | 1 | 1 | 0 | 1 |
| From L2 | 1 | 1 | 0 | 1 |
| From L3 | 1 | 0 | 1 | 1 |
| From L4 | 0 | 0 | 0 | 0 |

Consider that at time t1, a client is retrieving streams 1 and 4, however at a different point in time t2, the client needs the audio scene entity O2 as a movable, interactive, and/or more-perceptive audio scene element. For example, in terms of change in distance rendering. Accordingly, audio object would be preferred representation to use assigned to the audio scene entity O2. Based on description of streams above, it may be seen that the audio entity O2 is delivered as an object in streams 2 and 3. However, the miscibility matrix in Table 1 indicates that L2 from L1 can be mixed (represented by '1' under row 'from L1' and column 'To L2') and L3 from L1 cannot be mixed or would need flushing of the buffered content (represented by '0' under row 'from L1' and column 'To L3'). Consequently, the client selects stream 2 instead of stream 3. As apparent from the example, the decision is based on the miscibility matrix which defines if representations, streams or miscibility labels can be mixed or not. For example, the miscibility matrix indicates audio data corresponding to which miscibility labels can mixed together and audio data corresponding to which miscibility labels cannot be mixed together. In case the streams, representations, or miscibility labels cannot be mixed, the buffered content in a receive buffer needs to flushed, and new content needs to be retrieved.

The miscibility matrix also causes the client to decide on which content or stream to buffer for longer durations and which content should typically not be buffered for long durations. As apparent from Table 1, streams 1 and 2 have more flexibility in terms of mixing as compared to stream 3, which would necessitate flushing the receive buffers.

Figure 8:
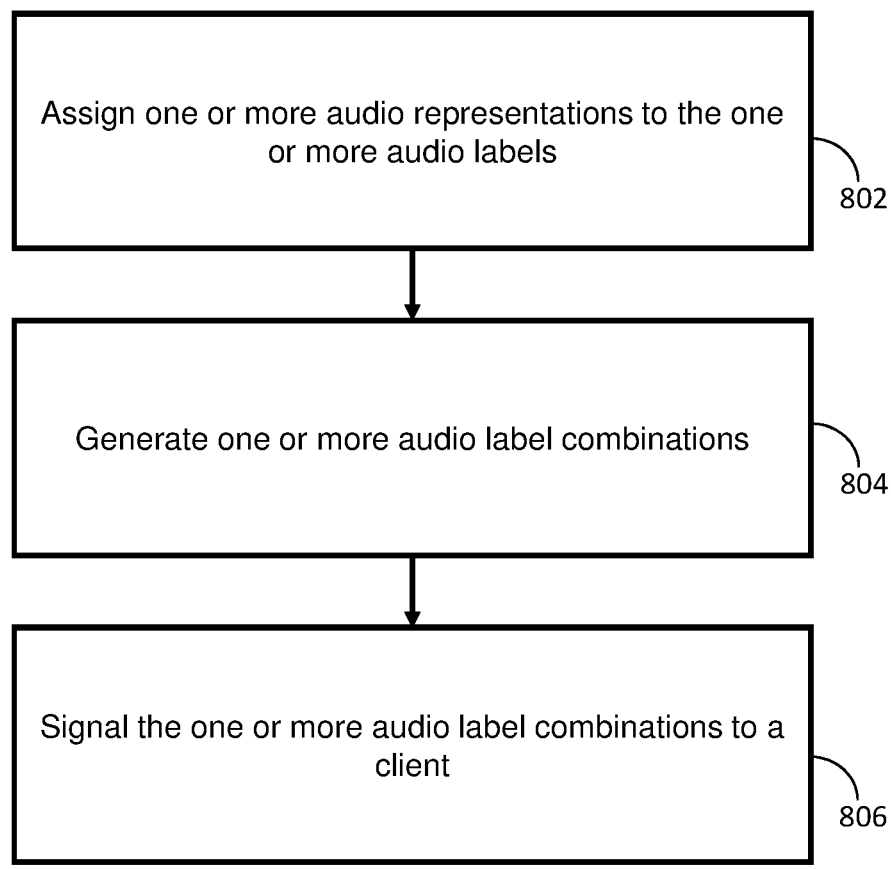
FIG. 8 illustrates a flow chart for a method of delivering audio scene entities, in accordance with yet another embodiment.

FIG. 8 illustrates a flow chart for a method of delivering audio scene entities, in accordance with yet another embodiment. References may be made to FIG. 1 and/or FIG. 4 to explain certain features of this embodiment. At 802, one or more audio representations are assigned to one or more audio scene entities in an audio scene. Examples of the audio representations include, but are not limited to, audio objects, higher order ambisonics, and channels. In an embodiment, the one or more audio representations may be assigned dynamically. In an embodiment, information for identifying a format of an audio representation is defined. For example, the information for identifying a format of an audio representation may be defined using a scene entity representation type filed. The scene entity representation type field takes values of '0', '1', '2', or '3'. A value of '0' is reserved, the value of '1' represents object representation format, a value of '2' represents channel representation format, and a value of '3' represents HOA representation format. The scene entity representation type filed may, for example, be defined as mae_scene_entity_representation_type field.

In an embodiment, information for identifying the audio scene is defined. For example, the information for identifying the audio scene may be defined by using an audio scene identity field. In an embodiment, audio scene identity field takes values between 0 and 255. In some embodiments, the value of 0 indicates that the audio scene identity field may not be evaluated. The audio scene identity filed may, for example, be defined as mae_audioSceneID field. In another embodiment, information for uniquely identifying an audio scene entity is defined. For example, the information for uniquely identifying an audio scene entity may be defined by using a scene entity identity field. The scene entity identity field may, for example, be defined as mae_scene_entity_ID field. In another embodiment, information for indicating a priority of the audio scene entity is defined. For example, the information for indicating a priority of the audio scene entity may be defined by using a scene entity priority field. The scene entity priority field may, for example, be defined as mae_scene_entity_priority field.

In an embodiment, the audio scene entities are included in a group definition structure. The group definition structure may, for example, be defined as mae_GroupDefinition( )structure.

In an embodiment, a label may be assigned to each audio scene entity. In an embodiment, each audio scene entity in the audio scene is assigned a unique label. For example, the audio scene entities 102, 104, 106, 108, 110, 112, 114, and 116 may assigned audio labels B1, B2, B3, B4, B5, B6, B7, and B8 respectively. Examples of the audio scene entities include, but are not limited to, a diegetic sound, an ambience sound, an audio source, a non-diegetic sound, and a combination thereof.

In an embodiment, the audio scene entities are packaged as MPEG-H audio streaming (MHAS) packet. In an embodiment, the MHAS packet comprises a scene description packet. The scene description packet may be delivered as SYN packet or CFG packet.

At 804, one or more audio scene entity combinations generated based on the one or more audio scene entities and the one or more audio representations. For example, in combination 1, the audio scene entities B1, B2, B4, and B5 are assigned audio representation in audio objects format; the audio scene entities B3 and B7 are assigned audio representation HOA format; and the audio scene entities B6 and B8 are assigned representation in channels format. In combination 2, the audio scene entities B1, B4, and B5 are assigned audio representation in audio objects format; the audio scene entities B2, B3 and B7 are assigned audio representation in HOA format; and the audio scene entities B6 and B8 are assigned representation in channels format. In combination 3, the audio scene entities B4, and B5 are assigned audio representation in audio objects format; the audio scene entities B2, B3 and B7 are assigned audio representation in HOA format; and the audio scene entities are B1, B6 and B8 are assigned representation in channels format. A total a K combinations are a possible.

In an embodiment, the value of K is defined by a content creator. In an embodiment, a number of audio scene entity combinations in the audio scene may be defined. For example, the number of audio scene entity combinations in the audio scene may be defined by using a number of groups field. In an embodiment, the number of groups field may take values between 0 and 127. In this embodiment, the constraint on the value of number of groups field may be changed by the content creator. The number of group field may, for example, be defined as mae_numGroups field. In an embodiment, the audio scene entities are included in a group definition structure. The group definition structure may, for example, be defined as mae_GroupDefinition( )structure. In embodiment, information for indicating overlapping content between audio scene entities may be defined. For example, the information for indicating overlapping content between audio scene entities may be defined or provided by using a group identity field and an audio element identity field. The group identity field and an audio element identity field may be incorporated in an audio label combination to indicate overlapping content between the audio labels. In another embodiment, information for indicating overlapping content between different audio scenes may be defined. For example, the information for indicating overlapping content between different audio scenes may be defined or provided by using group identity fields, audio element identity fields, and audio scene information identity fields of different audio scenes. The group identity field, the audio element identity, and the audio scene information identity field, may for example, be defined as an mae_groupID, mae_audioElementID, and mae_audioSceneInfoID respectively.

At 806, the one or more audio scene entity combinations are signaled to the client. In an embodiment, the audio representations assigned to the one or more audio scene entities cause the client to select an appropriate audio scene entity combination from the one or more audio scene entity combinations. In an embodiment, the audio representations cause the client to identify, if an audio entity or label is delivered as an object, as a part of a channel downmix, or as a higher order ambisonics.

In an embodiment, audio scene entities that are assigned same audio representation are grouped to form an audio scene entity group. As described in previous paragraph, number of group field may be used to indicate total number of audio scene entity combinations in the audio scene. In the above example, in combination 1, audio scene entities B1, B2, B4, and B5 are grouped together to form an audio scene entity group; and are represented using audio object format Similarly, audio scene entities in other audio scene entity combinations may be grouped. In an embodiment, an independent stream is generated for each audio scene entity combination. In an embodiment, an entity, for example, the entity 500 is defined in a header of the independent stream. The entity 500 includes a description of the audio scene entities that are grouped and an audio representation that is assigned to the group. In an embodiment, the entity 500 is included in an audio scene information field. The audio scene information may, for example, be defined as maeI.

In an embodiment, miscibility labels are assigned to each of the audio scene entity combination. Further, a miscibility matrix is generated based on the miscibility labels. The miscibility matrix indicates audio data corresponding to which miscibility labels can mixed together and audio data corresponding to which miscibility labels cannot be mixed together. The miscibility matrix and the miscibility labels are signaled to the client. The miscibility matrix and miscibility labels cause the client to decide whether to flush a receive buffer or not. In an embodiment, the miscibility label for each of the audio scene entity combination is signaled in a MPEG-DASH media presentation description. In an embodiment, the miscibility matrix is signaled in a header of an independent stream as a part of an initialization segment.

Figure 9:
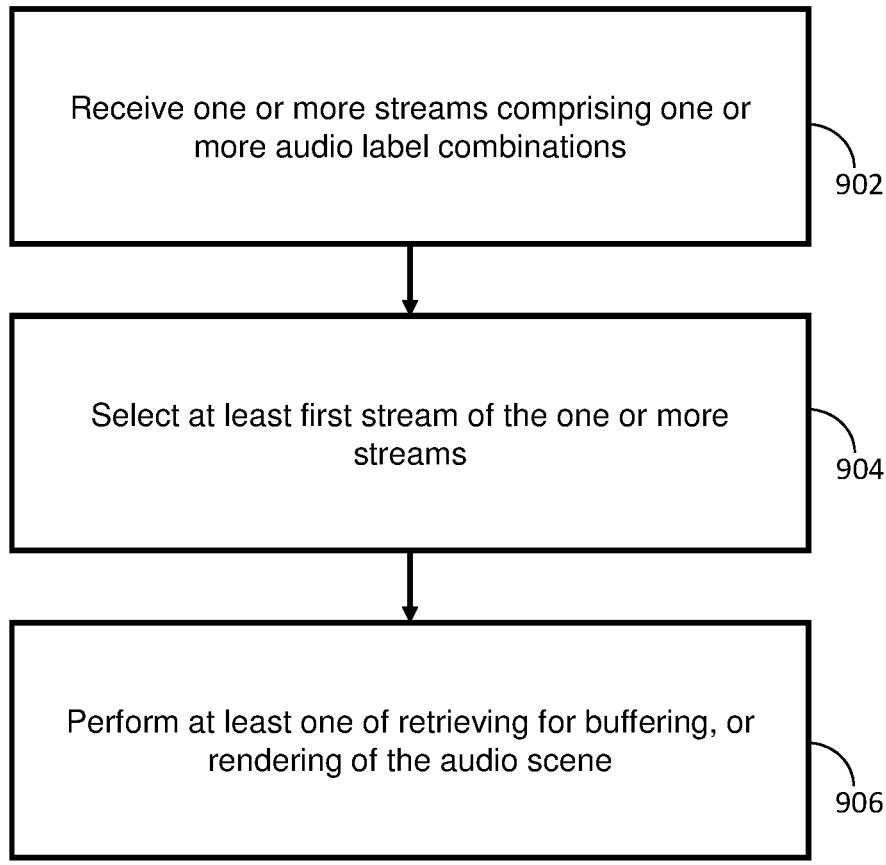
FIG. 9 illustrates a flow chart for a method of receiving audio scene entities, in accordance with embodiment.

FIG. 9 illustrates a flow chart for a method of receiving audio scene entities, in accordance with embodiment. At 902, one or more streams are received. The streams include audio scene entity combinations. In an embodiment, a unique label is assigned to an audio scene entity in an audio scene. The audio scene entities are assigned one or more audio representations. The audio scene entity combinations are generated based on the audio scene entities and the audio representations. Examples of the audio representations include, but are not limited to, objects, channels, and higher order ambisonics.

At 904, at least one stream that matches requirements of the client for rendering the audio scene is selected from one or more streams. For example, at least a first stream that matches requirements of the client for rendering the audio scene is selected from one or more streams. Audio representations associated with audio scene entities in the first stream cause the client to select the first stream. Examples of the requirements include, but are not limited to, priority of the audio scene entities, perception need of the audio scene entities, available bandwidth, computing resources available at a client, and combination thereof.

At 906, the first stream is retrieved for buffering, and/or rendering by the client. In an embodiment, a change in the requirements for rendering the audio scene is determined The change may be, for example, due change in the priority of the scene, or change in available bandwidth. For example, if the user starts moving towards the audio scene entities 112, 114, and 116 (refer to FIG. 1), the priority of the audio scene entities 112, 114, and 116 is increased. Accordingly, a stream including the audio scene entities 112, 114, and 116 in audio object format may be preferred to provide control and interactivity.

In an embodiment, there may more than one streams meeting the requirement, for example, including the audio scene entities 112, 114, and 116 in audio object format. In this embodiment, miscibility label of the buffered content of first stream and the miscibility matrix is read. The miscibility matrix is generated based on miscibility labels for streams and indicates audio data corresponding to which miscibility labels can mixed together and audio data corresponding to which miscibility labels cannot be mixed together. Accordingly, a second stream is selected based on the miscibility matrix and miscibility label of the buffered content of the first stream. The second stream maximally utilizes the buffered content of the first stream and meets the changed requirements for rendering the audio scene. In an embodiment, if there is only one second stream meeting the requirement, miscibility label of the buffered content of the first stream and miscibility matrix may be used to determine if the buffered content may be used or need to be flushed. For example, if it is determined that the buffered content of the first stream can be mixed with only available second stream, then the buffered content may completely or partially re-used. However, if it is determined that the buffered content of the first stream cannot be mixed with the only available second stream, then the buffered content need to be flushed from a receive buffer.

Figure 10:
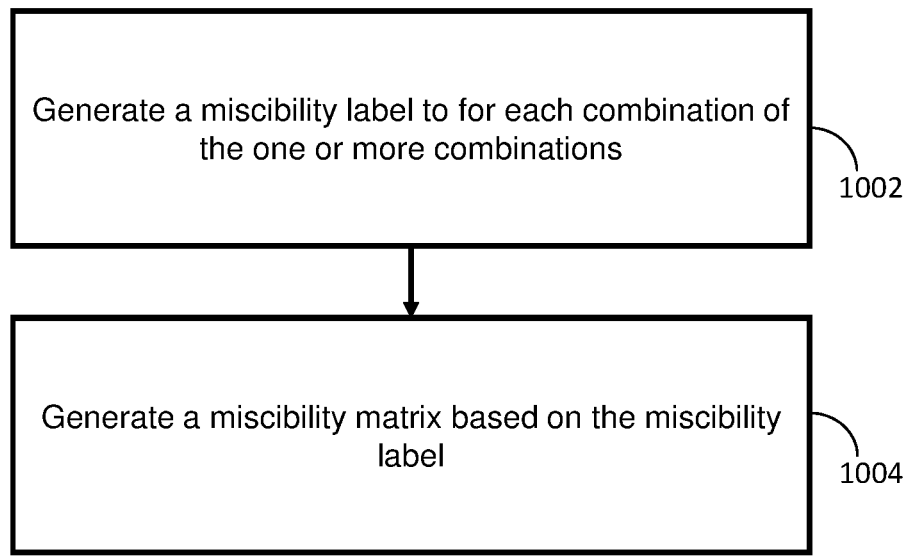
FIG. 10 illustrates a flow chart for a method of generating a miscibility matrix, in accordance with embodiment.

FIG. 10 illustrates a flow chart for a method of generating a miscibility matrix, in accordance with embodiment. At 1002, generate a miscibility label for each audio scene entity combination of one or more audio scene entity combinations. The one or more audio scene entity combinations include one or more audio scene entities from an audio scene. The one or more entities are assigned one or more audio representations. The one or more audio scene entity combinations are generated based on the one or more audio scene entities and the one or more audio representations.

At 1004, a miscibility matrix is generated based on the miscibility label assigned to each of the audio scene entity combination. The miscibility matrix indicates audio data corresponding to which miscibility labels can mixed together and audio data corresponding to which miscibility labels cannot be mixed together.

FIG. 11 illustrates an apparatus 1102, in accordance with an embodiment. The apparatus 1102 includes at least one processor 1104 and at least one memory 1106 including the computer program code.

The at least one processor 1104 may be embodied as a multi-core processor, a single core processor; or combination of multi-core processors and single core processors. For example, the at least one processor 1104 may be embodied as one or more of various processing means such as a coprocessor, a microprocessor, a controller, a digital signal processor (DSP), processing circuitry with or without an accompanying DSP, or various other processing devices including integrated circuits such as, for example, an application specific integrated circuit (ASIC), a field programmable gate array (FPGA), a microcontroller unit (MCU), a hardware accelerator, a special-purpose computer chip, or the like. In an example embodiment, the multi-core processor may be configured to execute instructions stored in the memory 1106 or otherwise accessible to the at least one processor 1104. Alternatively, or additionally, the at least one processor 1104 may be configured to execute hard coded functionality. As such, whether configured by hardware or software methods, or by a combination thereof, the at least one processor 1104 may represent an entity, for example, physically embodied in circuitry, capable of performing operations according to various embodiments while configured accordingly. For example, if the at least one processor 1104 is embodied as two or more of an ASIC, FPGA or the like, the at least one processor 1104 may be specifically configured hardware for conducting the operations described herein. Alternatively, as another example, if the at least one processor 1104 is embodied as an executor of software instructions, the instructions may specifically configure the at least one processor 1104 to perform the algorithms and/or operations described herein when the instructions are executed. However, in some cases, the at least one processor 1104 may be a processor of a specific device, for example, a mobile terminal or network device adapted for employing embodiments by further configuration of the at least one processor 1104 by instructions for performing the algorithms and/or operations described herein. The at least one processor 1104 may include, among other things, a clock, an arithmetic logic unit (ALU) and logic gates configured to support operation of the at least one processor 1104.

Examples of the at least one memory 1106 include, but are not limited to, volatile and/or non-volatile memories. Some examples of the volatile memory include, but are not limited to, random access memory, dynamic random-access memory, static random-access memory, and the like. Some examples of the non-volatile memory include, but are not limited to, hard disks, magnetic tapes, optical disks, programmable read only memory, erasable programmable read only memory, electrically erasable programmable read only memory, flash memory, and the like. The at least one memory 1106 and the computer program code, with the at least one processor 1104, cause the apparatus 1102 at least to perform one or more functions described in following paragraphs.

An example of the apparatus 1102 includes, but is not limited to, the content server 302. In an embodiment, the apparatus 1102 includes the audio encoder 402 to perform the one or more functions described in following paragraphs. In another embodiment, the audio encoder 402 may be incorporated as computer program code and may be included in the at least one memory 1106. In this embodiment, the encoder 402, the at least one memory 1106, and the at least one processor 1104 may cause the apparatus 1102 to perform the one or more functions described in following paragraphs.

The apparatus 1102 assigns one or more audio representations to one or more audio scene entities in an audio scene. In an embodiment, the apparatus 1102 defines information for identifying a format of an audio representation. For example, the information for identifying a format of an audio representation may be defined using a scene entity representation type field. The scene entity representation type field represents a format an audio representation. In an embodiment, the scene entity representation type field takes values of 0, 1, 2, or 3. In this embodiment, a value of '0' is reserved, a value of '1' represents an object representation format, a value of '2' represents a channel representation format, and a value of '3' represents an HOA representation format. The scene entity representation type field may, for example, be defined as mae_scene_entity_representation_type field.

In an embodiment, the apparatus 1102 defines information for identifying the audio scene. For example, the apparatus 1102 may define the audio scene by using an audio scene identity field. In an example, the audio scene identity field takes values between 0 and 255. In this embodiment, a value of '0' indicates that the audio scene identity field will not be evaluated. The audio scene identity field may, for example be, defined as mae_audioSceneID field. In an embodiment, the apparatus 1102 defines information for uniquely identifying an audio scene entity. For example, the information for uniquely identifying an audio scene entity may be defined using a scene entity identity field. The audio scene entity identity field may, for example, be defined as mae_scene_entity_ID. In an embodiment, the apparatus 1102 defines information for indicating a priority of the audio scene entity. For example, the information for indicating a priority of the audio scene entity may be defined using a scene entity priority field. The scene entity priority field may, for example, be defined as mae_scene_entity_priority field.

The processor 1104, the memory 1106 and the computer program also cause the apparatus 1102 to generate one or more audio scene entity combinations based on the one or more audio scene entities and the one or more audio representations. In an embodiment, the apparatus 1102 defines number of audio scene entity combinations in the audio scene. For example, a number of groups field may be used for defining the number of combinations. The number of groups field indicates number of audio scene entity combinations in the audio scene. In an embodiment, the number of groups field takes a value between 0 and 127. The restriction on value of the number of group field may be changed by a content creator. The number of groups field may, for example, be defined as mae_numGroups field.

Examples of the one or more audio representation include, but are not limited to, one or more of objects, channels, or higher order ambisonics. In an embodiment, the apparatus 1102 defines information for indicating overlapping content between audio scene entities. In an embodiment, the apparatus 1102 incorporates a combination of a group identity field and an audio element identity field in the one or more audio scene entity combinations to indicate overlapping content between audio scene entities. The group identity field and audio element identity filed may, for example, be defined as mae_groupID field and mae_audioElementID respectively. In an embodiment, the apparatus 1102 defines information for indicating overlapping content between different audio scenes. In an embodiment, the apparatus 1102 combines group identity fields, audio element identity fields, and audio scene information identity fields of different audio scenes to indicates overlapping content between the different audio scenes. An audio scene information identity field may, for example, be defined as mae_audiosceneInfoID.

The processor 1104, the memory 1106 and the computer program further cause the apparatus 1102 signal the one or more audio scene entity combinations to a client, wherein the one or more audio representations assigned to the one or more audio scene entities cause the client to select an appropriate audio scene entity combination from the one or more audio scene entity combinations to render the audio scene. In an embodiment, the apparatus 1102 of packs the audio scene entities as MPEG-H audio streaming (MHAS) packet that includes a scene description packet. In an embodiment, the apparatus 1102 includes the audio scene entities in a group definition structure. The group definition structure may for example, be defined as mae_GroupDefinition( ) structure.

In an embodiment, the apparatus includes means for assigning one or more audio representations to one or more audio scene entities in an audio scene; means for generating one or more audio scene entity combinations based on the one or more audio scene entities and the one or more audio representations; and means for signaling the one or more audio scene entity combinations to a client, wherein the one or more audio representations assigned to the one or more audio scene entities cause the client to select an appropriate audio scene entity combination from the one or more audio scene entity combinations to render the audio scene.

In an embodiment, the apparatus 1102 may group audio scene entities in an audio scene entity combination to form an audio scene entity group. The audio scene entities that are assigned same audio representation are grouped. In an embodiment, the apparatus 1102 may include a means for grouping the audio scene entities in an audio scene entity combination to form an audio scene entity group. The apparatus 1102 may generate independent streams for each audio scene entity combination.

In an embodiment, the apparatus 1102 provides description of the audio scene entities in the audio scene entity group and provides information about the audio representation assigned to the audio scene entity group. In an embodiment, description of the audio scene entities in the audio scene entity group and information about the audio representation assigned to the audio scene entity group are provided using a contributing scene entity in a header of the independent stream. The apparatus 1102 may also define audio scene information field to include the contributing scene entity. In an embodiment, the contributing scene entity and the audio scene information field may be defined as boxes. For example, contributing scene entity may be defined as contributing scene entity (CSCE) box and the audio scene information field may be defined as mael box.

In an embodiment, the apparatus 1102 assigns a miscibility label to each audio scene entity combination. In this embodiment, the apparatus 1102 generates a miscibility matrix based on the miscibility label assigned to the each audio scene entity combination. The miscibility matrix causes the client to determine audio data corresponding to which miscibility labels can mixed together and audio data corresponding to which miscibility labels cannot be mixed together. The apparatus 1102 signals the miscibility matrix and the miscibility label for the each audio scene entity combination to the client, for example, in a MPEG-DASH media presentation description.

FIG. 12 illustrates an apparatus 1202, in accordance with another embodiment. The apparatus 1202 includes at least one processor 1204 and at least one memory 1206 including computer program code. Some examples of the apparatus 1202 include, but are not limited to, the client 304, a pair of headphones and a head-mounted-display (HMD), or a single integrated device with head-tracking and headphone output functionality such as a mobile phone The at least one processor 1204 may be embodied as a multi-core processor, a single core processor; or combination of multi-core processors and single core processors. For example, the at least one processor 1204 may be embodied as one or more of various processing means such as a coprocessor, a microprocessor, a controller, a digital signal processor (DSP), processing circuitry with or without an accompanying DSP, or various other processing devices including integrated circuits such as, for example, an application specific integrated circuit (ASIC), a field programmable gate array (FPGA), a microcontroller unit (MCU), a hardware accelerator, a special-purpose computer chip, or the like. In an example embodiment, the multi-core processor may be configured to execute instructions stored in the at least one memory 1106 or otherwise accessible to the at least one processor 1204. Alternatively, or additionally, the at least one processor 1204 may be configured to execute hard coded functionality. As such, whether configured by hardware or software methods, or by a combination thereof, the at least one processor 1204 may represent an entity, for example, physically embodied in circuitry, capable of performing operations according to various embodiments while configured accordingly. For example, if the at least one processor 1204 is embodied as two or more of an ASIC, FPGA or the like, the at least one processor 1204 may be specifically configured hardware for conducting the operations described herein. Alternatively, as another example, if the at least one processor 1204 is embodied as an executor of software instructions, the instructions may specifically configure the at least one processor 1204 to perform the algorithms and/or operations described herein when the instructions are executed. However, in some cases, the at least one processor 1204 may be a processor of a specific device, for example, a mobile terminal or network device adapted for employing embodiments by further configuration of the at least one processor 1204 by instructions for performing the algorithms and/or operations described herein. The at least one processor 1204 may include, among other things, a clock, an arithmetic logic unit (ALU) and logic gates configured to support operation of the at least one processor 1204.

Examples of the at least one memory 1206 include, but are not limited to, volatile and/or non-volatile memories. Some examples of the volatile memory include, but are not limited to, random access memory, dynamic random-access memory, static random-access memory, and the like. Some examples of the non-volatile memory include, but are not limited to, hard disks, magnetic tapes, optical disks, programmable read only memory, erasable programmable read only memory, electrically erasable programmable read only memory, flash memory, and the like. The at least one memory 1206 and the computer program code, with the at least one processor 1204, cause the apparatus 1202 at least to perform one or more functions described in following paragraphs.

An example of the apparatus includes, but is not limited to, the client 304. The apparatus 1202 receives one or more streams comprising one or more audio scene entity combinations. The one or more audio scene entity combinations includes one or more audio scene entities from an audio scene. The one or more audio scene entities are assigned one or more audio representations. The one or more audio scene entity combinations are generated based on the one or more audio scene entities and the one or more audio representations. The apparatus 1202 selects at least a first stream of the one or more streams that matches requirements for rendering the audio scene. The apparatus 1202 further performs at least one of retrieving, buffering, or rendering the first stream. Example, of the one or more audio representations include, but are not limited to, objects, channels, or higher order ambisonics.

In an embodiment, the apparatus 1202 determines a change in the requirements to render the audio scene. The read a miscibility label of the buffered content of the first stream and a miscibility matrix. The miscibility matrix is generated based on miscibility labels for each stream of the one or more streams. The miscibility matrix indicates audio data corresponding to which miscibility labels can mixed together and audio data corresponding to which miscibility labels cannot be mixed together. The apparatus 1202 selects a second stream from the one or more streams based on the miscibility matrix and miscibility label of the buffered content. The second stream maximally utilizes the buffered content and meets the changed requirements to render the audio scene.

In an embodiment, the apparatus 1202 determines at least one of a position or an orientation of a user; determine one or more audio scene entities that are relevant for an audio scene based on the at least one of the position or the orientation of the user; select audio representations that match requirements to render the audio scene; select a media stream comprising audio scene entities represented in required audio representations; and perform at least one of retrieve, buffer, and/or render of the audio scene.

Using the approaches presented above may provide various advantages. Some example advantages include:
Optimal selection of different content representations based on scene description priority or player preferences;
Optimal reuse of prebuffered content;
Allow large prebuffering of content with reduced re-download;
Enable efficient bandwidth utilization by reducing repeat downloads of the same audio elements with different representations; and
Flexible 6DOF client implementations which utilize own preferences for rate adaptation algorithm.

The above-mentioned advantages are non-limiting and the scope of various embodiment is described in the appended claims.

In general, the various embodiments of the invention may be implemented in hardware or special purpose circuits or any combination thereof. While various aspects of the invention may be illustrated and described as block diagrams or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

Embodiments of the inventions may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

The foregoing description has provided by way of exemplary and non-limiting examples a full and informative description of the exemplary embodiment of this invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention.

The invention claimed is:

1. An apparatus comprising
at least one processor; and
at least one memory including computer program code;
the at least one memory and the computer program code configured to, with the at least one processor, cause the apparatus at least to perform:
assign one or more audio representations to one or more audio scene entities in an audio scene, wherein the one or more audio scene entities represent a respective source of audio within the audio scene;
generate a plurality of streams comprising a plurality of audio scene entity combinations including a first audio scene entity combination and a second audio scene entity combination based on the one or more audio scene entities and the one or more audio representations, the first audio scene entity combination and the second audio scene entity combination comprising the one or more audio scene entities having been assigned the one or more audio representations based on a corresponding audio representation format, wherein a first audio representation format corresponding to the first audio scene entity combination is different than a second audio representation format corresponding to the second audio scene entity combination;
assign a miscibility label to at least two audio scene entity combinations;
generate a miscibility matrix based on the miscibility label assigned to the least two audio scene entity combinations, wherein the miscibility matrix enables the client to determine audio data corresponding to which miscibility labels can be mixed together and audio data corresponding to which miscibility labels cannot be mixed together; and
signal the plurality of audio scene entity combinations and the miscibility matrix to a client to facilitate rendering of the audio scene based on one or more audio scene entity combinations and to facilitate selection of a different stream based on the miscibility matrix such that the different stream utilizes buffered content and meets changed requirements for rendering of the audio scene.

2. The apparatus of claim 1, wherein the one or more audio representations comprise one or more of objects, channels, or higher order ambisonics.

3. The apparatus of claim 1, wherein the apparatus is further caused to group audio scene entities in an audio scene entity combination to form an audio scene entity group, wherein the audio scene entities that are assigned a same audio representation are grouped together.

4. The apparatus of claim 1, wherein the apparatus is further caused to generate an independent stream for each audio scene entity combination.

5. The apparatus of claim 4, wherein the apparatus is further caused to:
provide description of the audio scene entities in the audio scene entity group; and
provide information about the audio representation assigned to the audio scene entity group.

6. The apparatus of claim 1, wherein the apparatus is further caused to signal the miscibility matrix and the miscibility label for the audio scene entity combination to the client in a MPEG- DASH media presentation description.

7. The apparatus of claim 1, wherein the apparatus is further caused to pack the audio scene entities as MPEG-H audio streaming (MHAS) packet, wherein the MHAS packet comprises a scene description packet.

8. The apparatus of claim 1, wherein the apparatus is further caused to define information for indicating overlapping content between audio scene entities.

9. The apparatus of claim 1, wherein the apparatus is further caused to define information for indicating overlapping content between different audio scenes.

10. The apparatus of claim 1, wherein the apparatus is further caused to define information for identifying the audio scene.

11. The apparatus of claim 1, wherein the apparatus is further caused to define a number of audio scene entity combinations in the audio scene.

12. The apparatus of claim 1, wherein the apparatus is further caused to define information for uniquely identifying an audio scene entity.

13. The apparatus of claim 12, wherein the apparatus is further caused to define information for indicating a priority of the audio scene entity.

14. The apparatus of claim 1, wherein the apparatus is further caused to define information for identifying a format of an audio representation.

15. The apparatus of claim 14, wherein a value of 1 represents an objects representation format, a value of 2 represents a channel representation format, and a value of 3 represents a higher order ambisonics (HOA) representation format.

16. An apparatus comprising
at least one processor; and
at least one memory including computer program code;
the at least one memory and the computer program code configured to, with the at least one processor, cause the apparatus at least to perform:
receive one or more streams comprising a plurality of audio scene entity combinations including a first audio scene entity combination and a second audio scene entity combination, wherein the plurality of audio scene entity combinations comprise one or more audio scene entities from an audio scene, wherein i) the one or more audio scene entities represent a respective source of audio within the audio scene, wherein one or more audio representations are assigned to the one or more audio scene entities, ii) the plurality of audio scene entity combinations are generated based on the one or more audio scene entities and the one or more audio representations, the first audio scene entity combination and the second audio scene entity combination comprising the one or more audio scene entities having been assigned the one or more audio representations based on a corresponding audio representation format, iii) a first audio representation format corresponding to the first audio scene entity combination is different than a second audio representation format corresponding to the second audio scene entity combination, iv) at least two audio scene entity combinations are labelled, and iv) information pertaining to the at least two audio scene entity combinations that enables a determination of audio data corresponding to which labels can be mixed together or audio data corresponding to which labels cannot be mixed together;

select, based on the one or more audio representations, at least a first stream of the one or more streams that matches requirements for rendering the audio scene;

perform at least one of retrieve, buffer, or render the first stream;

determine a change in the requirements to render the audio scene;

read a miscibility label of buffered content of the first stream;

read a miscibility matrix, wherein the miscibility matrix is generated based on miscibility labels for respective streams of the one or more streams, wherein the miscibility matrix indicates audio data corresponding to which miscibility labels can be mixed together and audio data corresponding to which miscibility labels cannot be mixed together; and select a second stream from the one or more streams based on the miscibility matrix and miscibility label of the buffered content, wherein the second stream utilizes the buffered content and meets the changed requirements to render the audio scene.

17. The apparatus of claim 16, wherein the one or more audio representations comprise objects, channels, or higher order ambisonics.

18. An apparatus comprising
at least one processor; and
at least one memory including computer program code;
the at least one memory and the computer program code configured to, with the at least one processor, cause the apparatus at least to perform:
determine at least one of a position or an orientation of a user;
determine one or more audio scene entities that are relevant for an audio scene based on the at least one of the position or the orientation of the user, wherein the one or more audio scene entities represent a respective source of audio within the audio scene;
select audio representations that match requirements to render the audio scene;
select, from a plurality of media streams comprising a respective audio scene entity combination of a plurality of audio scene entity combinations, a first media stream comprising a selected audio scene entity combination, the selected audio scene entity combination comprising audio scene entities represented in required audio representations matching the selected audio representations, wherein i) the plurality of audio scene entity combinations include a first audio scene entity combination and a second audio scene entity combination, the first audio scene entity combination and the second audio scene entity combination comprising the one or more audio scene entities having been assigned the one or more audio representations based on a corresponding audio representation format, wherein a first audio representation format corresponding to the first audio scene entity combination is different than a second audio representation format corresponding to the second audio scene entity combination and ii) at least two audio scene entity combinations are labelled, and iii) information pertaining to the at least two audio scene entity combinations that enables a determination of audio data corresponding to which labels can be mixed together or audio data corresponding to which labels cannot be mixed together;

perform at least one of retrieve, buffer, or render of the audio scene;

determine a change in the requirements to render the audio scene;

read a miscibility label of buffered content of the first media stream;

read a miscibility matrix, wherein the miscibility matrix is generated based on miscibility labels for respective media streams of the plurality of media streams including the first media stream, wherein the miscibility matrix indicates audio data corresponding to which miscibility labels can be mixed together and audio data corresponding to which miscibility labels cannot be mixed together; and select a second media stream from the one or more media streams based on the miscibility matrix and miscibility label of the buffered content, wherein the second media stream utilizes the buffered content and meets the changed requirements to render the audio scene.

19. An apparatus comprising
at least one processor; and
at least one memory including computer program code;
the at least one memory and the computer program code configured to, with the at least one processor, cause the apparatus at least to perform:
generate a label for respective audio scene entity combinations of a plurality of audio scene entity combinations that comprise one or more streams, the plurality of audio scene entity combinations including a first audio scene entity combination and a second audio scene entity combination, wherein the plurality of audio scene entity combinations comprise one or more audio scene entities from an audio scene, wherein the one or more audio scene entities represent a respective source of audio within the audio scene, wherein one or more audio representations are assigned to the one or more audio scene entities, and wherein the plurality of audio scene entity combinations are generated based on the one or more audio scene entities and the one or more audio representations, wherein the first audio scene entity combination and the second audio entity scene combination comprise the one or more audio scene entities having been assigned the one or more audio representations based on a corresponding audio representation format, wherein a first audio representation format corresponding to the first audio scene entity combination is different than a second audio representation format corresponding to the second audio scene entity combination;

generate information based on the labels assigned to the audio scene entity combinations, wherein the generated information enables the client to determine audio data corresponding to which labels can be mixed together or audio data corresponding to which labels cannot be mixed together; and
generate a miscibility matrix based on the labels assigned to the respective combinations, wherein the miscibility matrix indicates audio data corresponding to which labels can be mixed together and audio data corresponding to which labels cannot be mixed together in order to facilitate selection of a different stream based on the miscibility matrix such that the different stream utilizes buffered content and meets changed requirements for rendering the audio scene.

20. A method, comprising:
assigning one or more audio representations to one or more audio scene entities in an audio scene, wherein the one or more audio scene entities represent a respective source of audio within the audio scene;
generating a plurality of streams comprising a plurality of audio scene entity combinations including a first audio scene entity combination and a second audio scene entity combination based on the one or more audio scene entities and the one or more audio representations, the first audio scene entity combination and the second audio scene entity combination comprising the one or more audio scene entities having been assigned the one or more audio representations based on a corresponding audio representation format, wherein a first audio representation format corresponding to the first audio scene entity combination is different than a second audio representation format corresponding to the second audio scene entity combination;
assigning a miscibility label to at least two audio scene entity combinations;
generating a miscibility matrix based on the miscibility label assigned to at least two audio scene entity combinations, wherein the miscibility matrix indicates audio data corresponding to which miscibility labels can be mixed together and audio data corresponding to which miscibility labels cannot be mixed together; and
signaling the one or more audio scene entity combinations and the miscibility matrix to a client, to facilitate rendering of the audio scene based on one or more audio scene entity combinations and to facilitate selection of a different stream based on the miscibility matrix such that the different stream utilizes buffered content and meets changed requirements for rendering of the audio scene.

21. A computer program product comprising at least one non-transitory computer-readable storage medium, the non-transitory computer-readable storage medium comprising a set of instructions, which, when executed by a processor, cause an apparatus to at least perform:
assign one or more audio representations to one or more audio scene entities in an audio scene, wherein the one or more audio scene entities represent a respective source of audio within the audio scene;
generate a plurality of streams comprising a plurality of audio scene entity combinations including a first audio scene entity combination and a second audio scene entity combination based on the one or more audio scene entities and the one or more audio representations, the first audio scene entity combination and the second audio scene entity combination comprising the one or more audio scene entities having been assigned the one or more audio representations based on a corresponding audio representation format, wherein a first audio representation format corresponding to the first audio scene entity combination is different than a second audio representation format corresponding to the second audio scene entity combination;
assign a miscibility label to at least two audio scene entity combinations;
generate a miscibility matrix based on the miscibility label assigned to at least two audio scene entity combinations, wherein the miscibility matrix indicates audio data corresponding to which miscibility labels can be mixed together and audio data corresponding to which miscibility labels cannot be mixed together; and
signal the plurality of audio scene entity combinations and the miscibility matrix to a client, wherein the one or more audio representations assigned to the one or more audio scene entities facilitate selection, based on one or more requirements of the client, of an audio scene entity combination from the plurality of audio scene entity combinations for rendering the audio scene and facilitate selection of a different stream based on the miscibility matrix such that the different stream utilizes buffered content and meets changed requirements for rendering of the audio scene.

* * * * *